(12) United States Patent
Riepenhoff et al.

(10) Patent No.: US 11,290,830 B2
(45) Date of Patent: Mar. 29, 2022

(54) HEARING DEVICE INCLUDING A BATTERY AND AN ACOUSTIC VALVE

(71) Applicant: SONOVA AG, Staefa (CH)

(72) Inventors: Matthias Riepenhoff, Hombrechtikon (CH); Christian Landolt, Mollis (CH); Gerard Van Oerle, Uster (CH); Fethi Cherigui, Adliswil (CH); Manuel Weibel, Erlenbach (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 17/094,615

(22) Filed: Nov. 10, 2020

(65) Prior Publication Data

US 2021/0144492 A1    May 13, 2021

(30) Foreign Application Priority Data

Nov. 12, 2019  (DE) ..................... 10 2019 217 435.3

(51) Int. Cl.
*H04R 25/00* (2006.01)
*H01M 10/42* (2006.01)

(52) U.S. Cl.
CPC ........ *H04R 25/602* (2013.01); *H01M 10/425* (2013.01); *H04R 25/603* (2019.05); *H04R 2225/31* (2013.01); *H04R 2225/33* (2013.01); *H04R 2225/61* (2013.01); *H04R 2460/03* (2013.01); *H04R 2460/11* (2013.01)

(58) Field of Classification Search
CPC .............. H04R 25/602; H04R 2225/31; H04R 2225/33; H04R 25/00
USPC ................................................. 381/322, 323
See application file for complete search history.

(56) References Cited

U.S. PATENT DOCUMENTS

| 8,923,543 | B2 | 12/2014 | Sacha et al. |
| 9,931,099 | B1 * | 4/2018 | Fatteh ................. A61B 5/0004 |
| 10,567,891 | B1 * | 2/2020 | Stewart ................. H04R 25/65 |

FOREIGN PATENT DOCUMENTS

WO        2015195731        12/2015

* cited by examiner

*Primary Examiner* — Suhan Ni
(74) *Attorney, Agent, or Firm* — ALG Intellectual Property, LLC

(57) ABSTRACT

An illustrative hearing device includes a battery having a battery voltage, a microphone for transducing sound into an input signal, a processor configured to be operated with an operating voltage and to generate an output signal from the input signal, a speaker for transducing the output signal to an acoustic signal, and a valve. An acoustic effect of the valve is adjustable by applying a valve voltage, wherein the adjustment is controllable by the processor. The hearing device comprises a voltage regulator configured to generate the operating voltage from the battery voltage, wherein the operating voltage is less than the battery voltage and wherein the valve voltage is greater than the operating voltage.

16 Claims, 3 Drawing Sheets

HEARING DEVICE INCLUDING A BATTERY AND AN ACOUSTIC VALVE

RELATED APPLICATIONS

The present application claims priority to DE Patent Application No. 10 2019 217 435.3, filed Nov. 12, 2019, the contents of which are hereby incorporated by reference in their entirety.

BACKGROUND INFORMATION

U.S. Pat. No. 8,923,543 discloses a hearing device equipped with an electrically adjustable valve. If a valve voltage is applied to the valve, a current running through a solenoid results in an adjustment of the valve which causes an acoustic effect of the valve. A processor controls the electrical adjustment of the valve.

Electrically adjustable valves are also referred to as active valves. In the context of the description provided herein, a valve is to be understood as an electrically adjustable valve whose adjustment causes an acoustical effect in the hearing device. In some examples, adjusting the valve is referred to as switching or toggling. Switching can occur between two states, e.g. an open state in which the valve opens a sound canal, and a closed state in which the sound canal is closed. Likewise it is possible to switch between more than two states, for example by bringing a sound canal into a partially open state. The valve may also be configured so that multiple sound canals are opened or closed simultaneously by a switching operation.

The current required for switching a valve in a hearing device has to be provided by the hearing device. The required current lies within the magnitude of 5 to 50 milliamperes and is typically required for a period of a couple of milliseconds. Such short term power peaks are a high load for a hearing device which in normal operation needs only a few milliamperes. The power supply of the hearing device has to be able to provide such a peak power without any voltage drops which may affect the proper operation of the hearing device. Otherwise, audible electrical interferences may occur. Likewise, undesirable shut-off of the hearing device may occur if the high load on the power supply leads to a voltage drop. In a battery driven hearing device this is particularly critical if the state of charge of the battery is low as this increases the risk of a voltage drop at peak power.

If the hearing device has a battery voltage differing from an operating voltage of the processor and of other components of the hearing device, the operating voltage is generated from the battery voltage by a voltage regulator. For this purpose the voltage regulator has to be sufficiently dimensioned in order to be able to provide peak currents occurring when the valve is being switched without substantial voltage drop. Therefore, such a voltage regulator has to be overdesigned with regard to normal operation thus increasing costs. Moreover, a voltage regulator requires bigger electronic components in this case which conflicts with a targeted miniaturization of the device.

In order to toggle the valve, a short electrical pulse is required. Thereby, a minimum voltage is required as the valve will not switch reliably otherwise.

DETAILED DESCRIPTION

Figure 1:
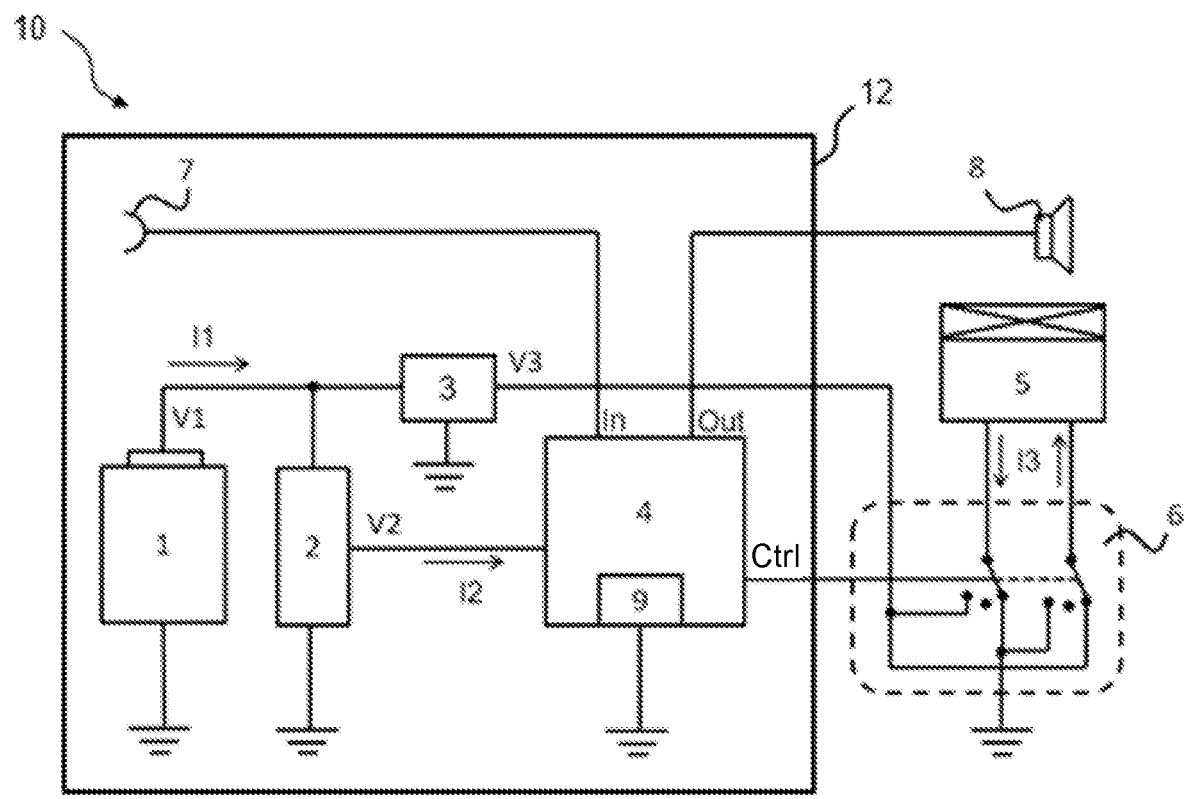
FIG. 1 is a block diagram of a hearing device having an active valve according to a first embodiment.

A hearing device including a battery and an acoustic valve is described herein. The hearing device may be a hearing amplifier or a hearing aid for compensating hearing loss of a wearer. The hearing device can be a hearing protector attenuating or cancelling ambient sound.

Acoustic valves may be inserted into a hearing device to adapt the hearing device to different settings. In the context of the description provided herein, the hearing device is at least in part worn within the ear canal.

The devices, systems, and methods described herein may provide a hearing device which solves or at least mitigates the aforementioned problems. Thus, the hearing devices described herein are an improvement over known hearing devices.

In some examples, a hearing device includes a battery as a power source, a processor and a valve, wherein an acoustic effect of the valve is adjustable by applying a valve voltage. The processor controls the adjustment of the valve. The operating voltage of the processor is generated by a voltage regulator. In an embodiment, a valve voltage required for switching the valve is not generated by the voltage regulator. The switching operation is controlled by the processor but does not load the voltage regulator which provides the operating voltage for the processor.

The hearing device described herein thus comprises: a battery having a battery voltage, an input for providing an input signal, a processor operated by an operating voltage and configured to process the input signal and to generate an output signal, a speaker configured to transduce the output signal to an acoustic signal, and a valve, wherein an acoustic effect of the valve is adjustable by applying a valve voltage, wherein the adjustment is controllable by the processor. The hearing device comprises a voltage regulator configured to generate the operating voltage from the battery voltage, wherein the operating voltage is less than the battery voltage and wherein the valve voltage is at least temporarily greater than the operating voltage.

In an embodiment, the battery is a rechargeable battery. This type of battery has a lower output resistance than conventional batteries and can provide a current pulse during the toggling operation without a significant voltage drop.

In another embodiment, the battery voltage is greater than or equal to 2 Volts and the operating voltage is less than or equal to 1.5 Volts. This brings the benefit that energy-efficient processors with operating voltages below 1.5 Volts may be applied. Despite the low operating voltage the valve is toggled reliably.

In a further embodiment, the battery is a lithium battery. Lithium technology provides operating voltages in the range of 3.6V-4V at high volumic energy. This results in a high valve voltage thus increasing the reliability of the switching operation.

In a further embodiment, the hearing device comprises a switching element, wherein the adjustment of the valve voltage by the processor, e.g. a signal processor, is effected through the switching element. This brings about the advantage that switches can be optimally dimensioned.

In a further embodiment, the switching element comprises a semiconductor. This brings about the advantage that a control current coming from the processor is very low so that the load on the voltage regulator is reduced. For example, bipolar or field effect transistors may be applied.

In a further embodiment, the hearing device comprises a filter connected or connectable with the battery and with the electric contact of the valve. This brings about the advantage that the current pulse straining the battery voltage occurring during the switching operation can be adjusted in a desired way. Actually, the filter may have an effect resulting in a desired type of current pulse.

In a further embodiment, the filter comprises a backup capacitor. The advantage lies in the fact that the current pulses retroact less strongly on the battery voltage and that interference during switching is avoided.

In a further embodiment, the filter comprises a capacitor integrated in the current path. The advantage is that the duration of the current pulse during the switching operation can be limited.

In a further embodiment, the filter comprises an inductivity integrated in the current path. The advantage is that the current during the switching operation can be limited, wherein no energy loss occurs in an advantageous embodiment.

In a further embodiment, the filter comprises a further voltage regulator. This brings about the advantage that the valve voltage may be ruggedly generated independent from the state of charge of the battery.

The filter has an input and an output and may also have a connection to a ground conductor. This is an advantage in particular if the filter comprises a backup capacitor or a voltage regulator.

In a further embodiment, the voltage regulator is a switching is a DC voltage regulator. This type of regulators has a high efficiency. This is advantageous in particular for the case that a high battery voltage is to be converted to a substantially lower value. The advantage is particularly high when using a lithium technology battery.

In a further embodiment, the switching element is integrated with the valve. This brings about the advantage of a compact design.

In a further embodiment, the switching element is integrated with the processor. This brings about the advantage of a compact design.

In a further embodiment, the speaker is electrically connected to the processor by two audio lines and the valve comprises a solenoid having a coil with a first contact and a second contact, wherein the first contact is connected to the processor through one of the audio lines and the second contact is connected to the processor either through the other audio line or through at least one separate control line. This way the wiring effort for operating the valve and the speaker can be reduced, e.g. by having to provide only two or three contacts for the valve and the speaker.

FIG. 1 is a simplified block diagram of an illustrative embodiment of the hearing device 10. A battery 1 provides a battery voltage V1 which is converted by a voltage regulator 2 into an operating voltage V2. A processor 4 is operated by the operating voltage V2. The processor 4 requires an operating current I2 for operation. The processor 4 receives an input signal In from a signal input 7. This input signal In can for example be provided by a microphone 7 or another signal input 7, e.g. a wireless receiver. An audio signal processing is carried out in the processor 4, wherein the input signal In is converted to an output signal Out. The output signal Out is fed to a speaker 8 which transduces it into sound audible by a user of the hearing device 10. A valve voltage V3 is generated from the battery voltage V1 by means of an electrical component 3.

The processor 4 controls the application of the valve voltage V3 to a valve 5. The valve 5 is an acoustic valve configured to adjust an effective size of a vent running through the hearing device 10. The effective size of the vent can be changed by applying the valve voltage V3; the valve 5 can in particular be opened or closed this way. The processor 4 comprises a data memory 9 in which data referring to the audio signal processing are stored. Likewise, information regarding the control of the valve 5 can be stored in the data memory 9. This information can for example comprise times relating to the duration of a voltage applied to the valve 5. It is possible and desirable to apply the valve voltage V3 only for a short time period. This way, a valve current I3 can run through the valve 5 in the form of short current pulses. This brings about the advantage that the current consumption of the valve 5 is reduced as compared to a continuous current supply and that the life expectancy of the valve 5 is increased. For example, the duration of such current pulses can be optimized for a type of valve applied.

In the data memory 9, information regarding the type of valve 5 can be stored. It is conceivable that a certain valve type requires a certain pulse duration to perform a switching operation. The pulse duration can be in the range of 0.1 to 10 milliseconds depending on the type. Note that the voltage regulator 2 has only to provide the operating current I2 during the switching operation, as the valve current I3 is provided through a separate path. The sum of the operating current I2 and the valve current I3 equals a battery current I1 taken from the battery 1.

Typically, the valve 5 is opened by applying a current pulse and closed by a current pulse having the reverse polarity. If a switching of the valve 5 is not intended the valve 5 can be cut off. The polarity of the current pulse is controlled by the processor 4; it is also possible to control the cut-off state by the processor 4. The processor 4 comprises a control input Ctrl. The control input Ctrl can comprise one or more electric conductors.

A switching element 6 is configured to apply the valve voltage V3 to the valve 5 in order to bring about a first switching state. For example, in this switching state the valve 5 is open. By applying the valve voltage V3 with reverse polarity the valve 5 is brought into a second switching state, e.g. a closed state. If switching is not required the switching element 6 can bring the valve 5 into a cut off state or can at least significantly reduce the valve's 5 current consumption. The switching operations of the switching element 6 are controlled by the processor 4. For this purpose, the processor 4 can have a control output Ctrl which can comprise one, two or more electrical connections.

In the simplest case the valve 5 can be connected to the battery 1 directly through the switching element 6. This brings about the advantage that there is no wiring effort.

According to an embodiment the hearing device 10 comprises a filter 3 as an electric component 3. The filter 3 is an electrical filter integrated in the current path before the valve 5. In an advantageous embodiment the filter includes electronic components though.

In the embodiment shown in FIG. 1 the battery 1, the voltage regulator 2 and the processor 4 are integrated in a control module 12. The switching element 6 can form a subassembly with the processor 4 and also be integrated with the control module 12. Likewise, the switching element 6 can be provided externally from the control module 12. For example, the switching element 6 can form a subassembly with the valve 5.

Figure 2A:
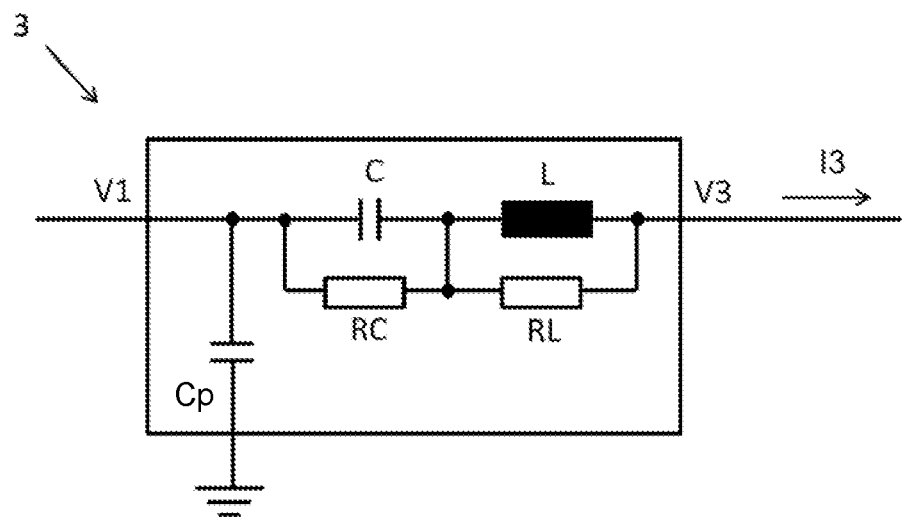
FIG. 2a is a schematic view of an electric filter according to an embodiment.

FIG. 2a schematically shows the filter 3. A backup capacitor Cp has a stabilizing effect on the input voltage of the filter and reduces electrical interference pulses during the switching operation of the valve 5. A capacitor C acts as a high-pass filter for the current running through the filter. An inductivity L acts as a low-pass filter for the current running through the filter. The effect of the filter 3 can be optimized by further optional components, e.g. a resistor RC in parallel to the capacitor C or a resistor RL in parallel to the inductivity L. The filter 3 can comprise further elements to achieve a desired effect on the course of the current running through the valve 5 in particular during the switching operation. In the simplest case the filter 3 can be a wire since a wire also exhibits an inductivity L and an electrical resistance.

Figure 2B:
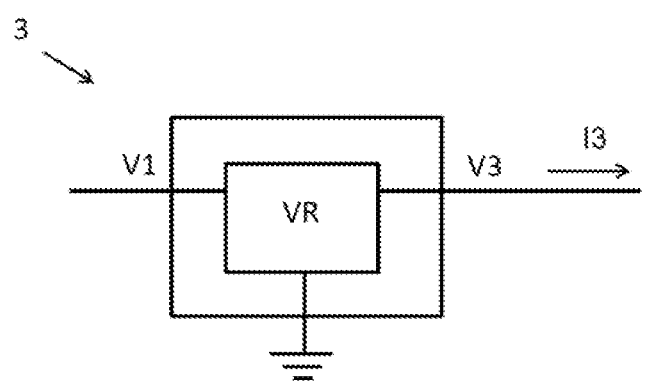
FIG. 2b is a schematic view of a voltage regulator according to an embodiment.

FIG. 2b shows the filter 3, comprising a further voltage regulator VR.

Figure 3:
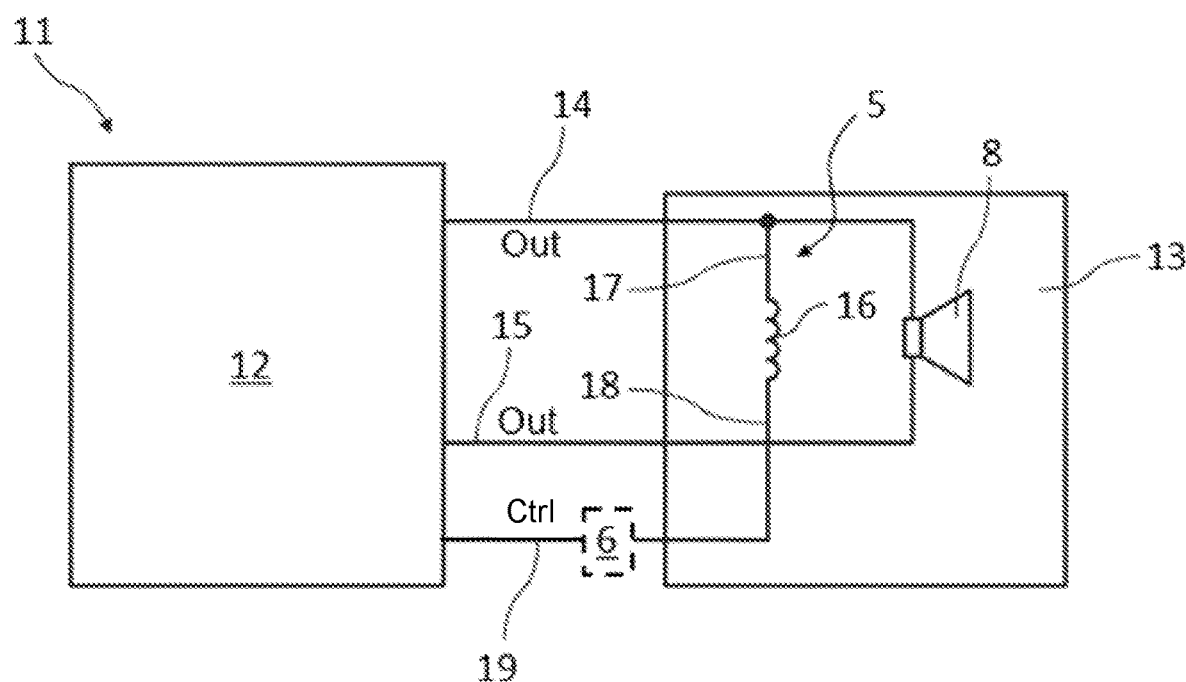
FIG. 3 is a block diagram of a hearing device according to the invention having an active valve according to a second embodiment.

FIG. 3 shows a simplified block diagram of a further embodiment of the hearing device 11. The hearing device 11 comprises the control module 12 and a further module 13, in which the speaker 8 and a coil 16 are integrated. The coil 16 is a component of the valve 5 by which a toggling between an open state and a closed state of the valve 5 may be activated. The coil 16 is configured as part of an electromagnet, e.g. a solenoid. The module 13 comprises three signal inputs. Two of these inputs are connected to the control module 12 through a respective audio line 14, 15. The audio lines 14, 15 can be differential audio lines. A third input of the module 13 is connected to the control module 12 by a separate control line 19.

The coil 16 comprises a first contact 17 and a second contact 18. The first contact 17 is connected to the control module 12 through one of the audio lines 14, 15. The second contact 18 is connected to the control output Ctrl of the processor 4 through the separate control line 19. The valve 5 can thus be directly controlled by one of the audio lines 14, 15 and by the control line 19. A switching state of the valve 5 can be brought about by the switching element 6 in the control line 19 as described. The audio lines 14, 15 can be provided with a driving capability, e.g. by hardware, sufficient to switch the valve 5 in both directions, i.e. to open and close the valve 5. The toggling can lead to a short interruption of the audio signal Out to the speaker 8.

The control output Ctrl can for example also assume a high impedance state. In particular, the control output Ctrl can be tri-state and assume the states high, low and high impedance. This can be achieved by a semiconductor driver configured as a tri-state buffer. The semiconductor driver can be formed by the switching element 6. The valve 5 can be switched by controlling the tri-state control output Ctrl if a sufficiently high voltage is generated through the coil 16. The control output Ctrl should by high impedance for the normal operation of the speaker 8 to prevent any additional current from running through the valve 5.

In an exemplary embodiment the valve 5 opens if the control output Ctrl switches to a low level. If the control output Ctrl switches to a high level, the valve 5 closes. If the control output Ctrl assumes a high impedance state, the valve 5 remains in his current state. In order to avoid artifacts for the speaker 8 in the output signal Out, a uniform DC offset can be generated in the output signal Out at both outputs 14, 15 during toggling of the valve 5, such that the speaker 8 does not generate an output when toggling. For example, the DC offset can be generated at the outputs 14, 15 by an amplifier.

LIST OF REFERENCES 1 battery
2 voltage regulator
3 filter, electric component
4 processor
5 valve
6 switching element
7 signal input, microphone
8 speaker
9 data memory
10 hearing device
11 hearing device
12 control module
13 further module
14 audio line
15 audio line
16 coil
17 contact
18 contact
19 control line
V1 battery voltage
V2 operating voltage
V3 valve voltage
I1 battery current
I2 operating current
I3 valve current
In input signal
Out output signal
Ctrl control output
Cp backup capacitor
C capacity
L inductivity
RC resistor in parallel with the capacity
RL resistor in parallel with the inductivity
VR further voltage regulator

What is claimed is:

1. A hearing device, comprising:
a battery having a battery voltage,
a microphone for transducing sound into an input signal,
a processor configured to be operated with an operating voltage and to generate an output signal from the input signal,
a speaker for transducing the output signal to an acoustic signal, and
a valve, wherein an acoustic effect of the valve is adjustable by applying a valve voltage, wherein the adjustment is controllable by the processor,
wherein the hearing device comprises a voltage regulator configured to generate the operating voltage from the battery voltage, wherein the operating voltage is less than the battery voltage and wherein the valve voltage is greater than the operating voltage.

2. The hearing device according to claim 1, wherein the battery is a rechargeable battery.

3. The hearing device according to claim 1, wherein the battery voltage is greater than or equal to 2 Volts, and the operating voltage is less than or equal to 1.5 Volts.

4. The hearing device according to claim 3, wherein the battery is a lithium battery.

5. The hearing device according to claim 1, comprising a switching element, wherein the adjustment of the valve voltage by the processor is effected through the switching element.

6. The hearing device according to claim 5, wherein the switching element is configured to:
apply the valve voltage to the valve, or
apply the valve voltage to the valve with reverse polarity, or
cut the valve off from the valve voltage.

7. The hearing device according to claim 6, wherein the switching element comprises a semiconductor.

8. The hearing device according to claim 5, wherein the switching element forms a subassembly with the valve.

9. The hearing device according to claim 5, wherein the switching element forms a subassembly with the processor.

10. The hearing device according to claim 1, further comprising a filter, wherein the battery is connected or connectable with the electrical contact of the calve through the filter.

11. The hearing device according to claim 10, wherein the filter comprises a capacity and/or an inductivity.

12. The hearing device according to claim 10, wherein the filter comprises a further voltage regulator.

13. The hearing device according to claim 10, wherein the filter comprises a backup capacitor (Cp).

14. The hearing device according to claim 1, wherein the voltage regulator is a switching DC voltage regulator.

15. The hearing device according to claim 1, wherein the speaker is electrically connected to the processor by two audio lines and the valve comprises a solenoid having a coil with a first contact and a second contact, wherein the first contact is connected to the processor through one of the audio lines and the second contact is connected to the processor either through the other one of the audio lines or through at least one separate control line.

16. The hearing device according to claim 1, wherein the processor is configured to be operated by the operating voltage and an operating current, wherein the acoustic effect of the valve is adjustable by applying the valve voltage and a valve current, wherein the valve current is provided through a separate path such that the voltage regulator only provides the operating current.

* * * * *